United States Patent

[11] 3,628,870

[72] Inventor Yoshisada Hayamizu
 Tokyo, Japan
[21] Appl. No. 56,114
[22] Filed July 2, 1970
[45] Patented Dec. 21, 1971
[73] Assignee Olympus Optical Company Limited
 Tokyo, Japan
[32] Priorities Mar. 22, 1967
[33] Japan
[31] 42/17363;
 Sept. 20, 1967, Japan, No. 42/59839
 Continuation of application Ser. No.
 697,175, Jan. 11, 1968, now abandoned.
 This application July 2, 1970, Ser. No.
 56,114

[54] DEVICE FOR MEASURING AMOUNT OF DISPLACEMENTS WITH AID OF GRATINGS
 5 Claims, 9 Drawing Figs.
[52] U.S. Cl. ........................................... 356/170,
 250/237 G
[51] Int. Cl. ........................................... G01b 11/26
[50] Field of Search .................................. 250/237 G;
 356/139, 141, 152, 169, 170, 171, 172

[56] References Cited
 FOREIGN PATENTS

| | | | |
|---|---|---|---|
| 782,831 | 1957 | Great Britain | 356/169 |
| 991,710 | 1965 | Great Britain | 250/237 G |
| 398,097 | 1966 | Switzerland | 356/169 |
| 782,831 | 1957 | Great Britain | 356/169 |
| 991,710 | 1965 | Great Britain | 250/237 G |
| 398,097 | 1966 | Switzerland | 356/169 |

*Primary Examiner*—Ronald L. Wibert
*Assistant Examiner*—Jeff Rothenberg
*Attorney*—Waters, Roditi & Schwartz

ABSTRACT: A device for measuring the magnitude of displacements with the aid of gratings having a real image optical system whose magnification is one with a reflection optical system adapted to reflect a light incident on a grating plane and project the light again on the same grating plane in a direction which is the same as that of the incident light to produce a moire fringe whose strength varies in response to the displacement of the grating. The moire fringe thus produced is observed to measure the amount of displacement of the grating. An elongated grating is used in case of measuring a linear displacement of the grating, while a radial grating is used in case of measuring an angular displacement of the grating.

DEVICE FOR MEASURING AMOUNT OF DISPLACEMENTS WITH AID OF GRATINGS

This is a continuation of application Ser. No. 697,175, filed Jan. 11, 1968, now abandoned.

The present invention relates to a device for measuring the magnitude of displacements with the aid of gratings and more particularly a device for measuring the magnitude of a linear displacement by means of an elongated grating and the magnitude of an angular displacement by means of a radial grating.

Heretofore, it has been proposed to cause one or two gratings to produce a so-called moire fringe and observe the variation of the strength of the moire fringe caused by the displacement of the grating so as to measure the displacement of the grating. However, such well-known devices require a high degree of manufacturing techniques and tolerances, are low in measuring accuracy, and are not stable in operation, so that they are very inconvenient in case of applying them to the practical field for measuring displacements.

The principal object of the invention is to obviate such disadvantages and provide a device for measuring linear and angular displacements by utilizing the moire fringe, and which is easy in assembling and high in accuracy and extremely stable in operation.

A feature of the invention is the provision of such an improved device for measuring the magnitude of displacements with the aid of gratings, which incorporates a real image optical system whose magnification is one, said optical system including a reflection optical system adapted to reflect a light incident on a grating plane so as to cause the reflected light to project again onto the grating plane in a direction which is the same as that of the incident light and being capable of placing an image of the grating upon the grating plane and hence producing a moire fringe whose strength varies in response to the displacement of the grating and hence measuring the amount of displacement of the grating.

Other objects, features and advantages of the invention will become apparent from a consideration of the following description in conjunction with the accompanying drawing, in which.

The invention will now be described with reference to devices for measuring the magnitude of displacements with the aid of gratings heretofore proposed and shown in FIGS. 1-3.

Figure 1:
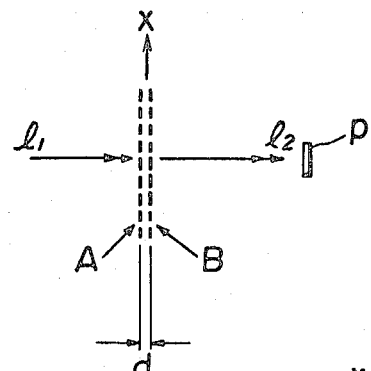
FIGS. 1, 2 and 3 are diagrammatic illustrations of devices for measuring displacements with the aid of gratings heretofore proposed.

A device shown in FIG. 1 comprises two gratings A and B arranged in opposition and closely spaced apart by a distance $d$. A light $l_1$ incident on the two gratings A and B emits light $l_2$ whose strength varies in response to the relative position of the two gratings A and B. The strength of the emitted light $l_2$ varies simultaneously when the grating B is displaced in a direction shown by an arrow $x$ which is substantially perpendicular to the direction of the grating lines shown by dotted lines. This sinusoidally varying light $l_2$ arrives at a photoreceiver $p$ and electric pulses generated can be counted so as to measure the displacement of the grating B.

Figure 2:
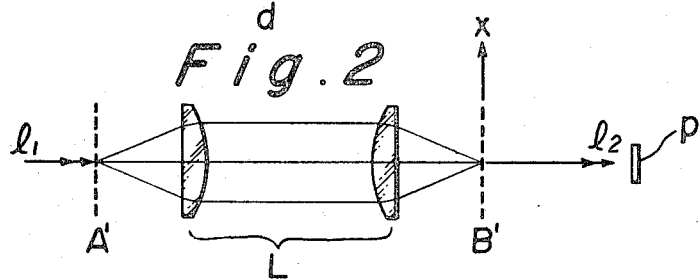

Another device shown in FIG. 2 comprises two gratings A' and B' and a real image lens system L whose magnification is one. This device has the advantage that the value corresponding to the distance $d$ shown in FIG. 1 becomes almost zero, which permits obtaining a better contrast of the moire fringe of the light $l_2$ leaving the grating B'.

Figure 3:
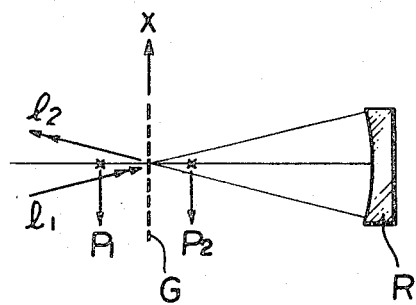

A still further device shown in FIG. 3 comprises one grating G and a reflection optical system R and is capable of placing the image of the grating G reflected at the reflection optical system R upon the grating plane G. This device has the advantage that the displacement of the grating G which is one-half that of the grating B shown in FIG. 1 is sufficient to produce electric pulses which are the same in number as those produced by the device shown in FIG. 1 provided the grating constants are the same in both devices and hence the accuracy becomes higher.

However, all of the above devices require a high degree of manufacturing techniques, are low in measuring accuracy, and are not stable in operation for the following reasons.

In the device shown in FIG. 1 it is required to make the value of the distance $d$ extremely small so that an elongated grating could not be utilized. Moreover, the moire fringe produced is very sensitive to slight variations of the relative position between the grating lines of both of the stationary grating A and the movable grating B. Thus, it is necessary to control the direction of the grating line in an extremely severe manner in case of displacing the grating B.

The device shown in FIG. 2 is required to displace the grating by an extremely small distance along the direction of the grating line and plane. In order to obviate such disadvantage, the gratings A' and B' may be assembled into an integral unit. In this case, however, the gratings A' and B' should be made the same in length and the two elongated gratings A' and B' should be displaced while maintaining a great distance therebetween, with the result that the space necessary for the displacement of the two elongated gratings spaced apart by the great distance becomes very large, that the device as a whole becomes considerably large in size, and that in case of building the device in a milling machine the device becomes located upon a mechanism necessary for the milling machine so that such built-in device hinders the operation of the milling machine and hence could not be employed for it.

The device shown in FIG. 3 makes use of one grating only so that its accuracy becomes two times higher than that of the devices shown in FIGS. 1 and 2. But, this device has the disadvantage that the grating plane should be displaced by one-half less than the displacement of the devices shown in FIGS. 1 and 2. If the grating plane is displaced to a point $p$ shown in FIG. 3, the image of the point $P_1$ will be reproduced at a point $P_2$ and hence will not be placed on the grating plane. The magnification of the reflection optical system R is one so that the displacement of the grating plane causes the image to displace two times greater than the displacement of the image reproduced by the devices shown in FIGS. 1 and 2. Thus, the device shown in FIG. 3 permits displacing the grating plane for a distance which is one-half that of the devices shown in FIGS. 1 and 2 in order to obtain the same degree of the displacement of the image, with the result that the device shown in FIG. 3 requires an extremely high accuracy. Moreover, the device shown in FIG. 3 has the disadvantage that provision must be made for a semitransparent mirror which limits the field necessary for the grating plane and hence the brightness thereof becomes decreased.

Figure 4:
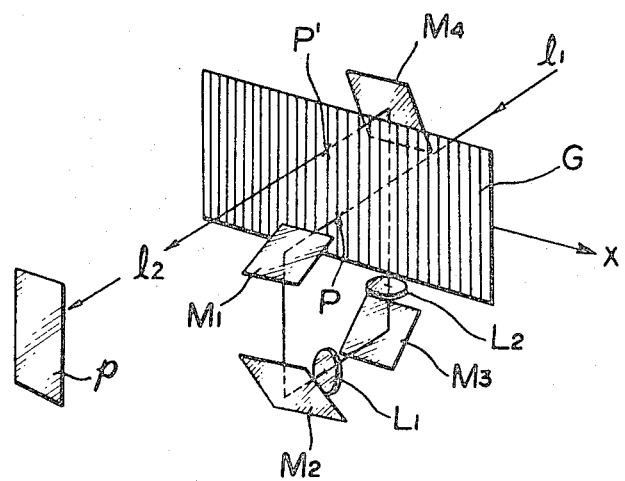
FIGS. 4 and 5 are diagrammatic illustrations of an embodiment of a device for measuring displacements with the aid of gratings according to the invention with an elongated grating.

In order to obviate the above disadvantages of the heretofore-proposed devices, the invention (FIG. 4) provides such an improved device which makes use of a suitable inverted real image system whose magnification is one and including reflection mirrors $M_1$, $M_2$, $M_3$ and $M_4$, convergent lenses $L_1$ and $L_2$, and an elongated grating G. These optical elements of the real image system are constructed and arranged such that light $l_1$ incident on the grating G in a direction which is substantially perpendicular thereto is reflected at the mirrors $M_1$ and $M_2$ to a direction which is substantially opposite to the direction of the incident light $l_1$ and then passes through the lens $L_1$ and then reflected at the mirror $M_3$ and the reflected light passes through the lens $L_2$ and arrives at the mirror $M_4$ where it is reflected in a direction which is substantially the same as that of the incident light $l_1$. The convergent lenses $L_1$ and $L_2$ consist of lens systems having the same construction. If the focal points of the lenses $L_1$ and $L_2$ are located on the grating plane G, these lenses are capable of inverting the position of the image of the grating from upside to down and vice versa to place the image of the grating upon the grating plane and provide an inverted real image system whose magnification is one.

If it is assumed that the image of a point P on the grating plane is reproduced at a point $P^1$ and the grating G is caused to displace in a direction $x$ shown by an arrow, the image of that portion of the grating which is positioned near the point P and reproduced near the point $P^1$ will be moved relative to that portion of the grating which is positioned near the point $P^1$ with a speed which is two times higher than the displacement of the grating G. Thus, the strength of the moire fringe produced by placing the image upon the grating varies sinusoidally in response to the displacement of the grating G, thereby generating a number of electric pulses at a photoreceiver $p$. The number of these pulses are two times larger than that of the grating lines corresponding to the amount of displacement of the grating G, with the result that the displacement of the grating G can be measured by counting the variation of the strength of the moire fringe in an accurate manner, the accuracy being two times higher than that of the well-known devices.

Figure 5:
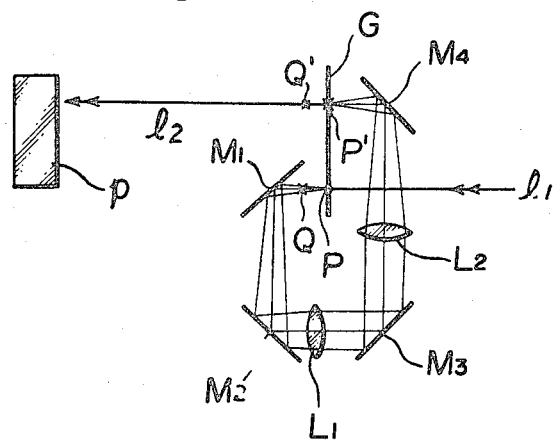

An image $Q'$ of a point Q not located on the grating plane G is not placed upon the grating plane G as shown in FIG. 5. In such case, the real image optical system whose magnification is one makes it possible to always satisfy the relation $QP=Q'P'$. Thus, if the grating face is displaced from a plane containing PP' to another plane containing QQ', the image of the grating will be placed upon the grating plane. Thus, the contrast of the moire fringe is never deteriorated. The device shown in FIG. 4 renders it possible to effect the measurement without adversely affecting it even when the grating is displaced in a direction perpendicular to the grating plane.

If the grating rotates during the displacement thereof owing to mechanical deficiency or the like, the image of the grating will also rotate in a direction which is the same as that of the grating so as to make the difference in directions of the grating and the image thereof always constant. This is evident, because the image of the grating as a whole is reproduced by means of the inverted real image system whose magnification is one, so that the position of the image is inverted from upside to down and vice versa.

If the difference in the directions of the grating and of the image thereof varies, the strength of the moire fringe will also be changed in an extremely sensitive manner, so that it is necessary to make such difference always constant. The invention permits maintaining such difference always constant even when the grating is inclined from its original position, so that special attention is not required.

As can be seen from the above, the device according to the invention incorporates a real image optical system whose magnification is one, said optical system including a reflection optical system adapted to reflect light incident on a grating plane so as to cause the reflected light to project again onto the same grating plane in a direction which is the same as that of the incident light and is capable of placing an image of the grating upon the grating plane and producing a moire fringe whose strength varies in response to the displacement of the grating and hence measuring the amount of displacement of the grating. The device according to the invention has the advantage that the displacement of the grating can be measured with high accuracy in an extremely stable manner without being adversely affected by the displacement of the grating plane and by the inclination of the grating plane from its original position.

In the above-mentioned embodiment, use is made of an elongated grating so as to measure its linear displacement, yet the principle according to the invention may also be applied to a radial grating so as to measure its angular displacement with a high accuracy and in a stable manner.

Figure 6:
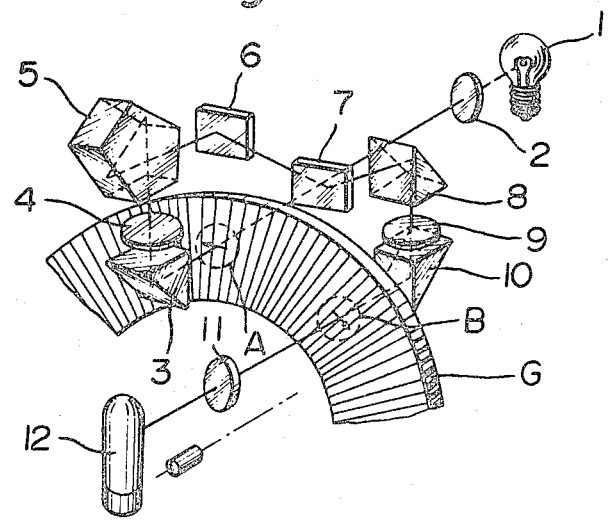
FIG. 6 is a diagrammatic illustration of another embodiment of the device according to the invention with a radial grating.

FIG. 6 diagrammatically illustrates such an improved device according to the invention with a radial grating.

Referring to FIG. 6, 1 designates a light source, 2 a collimator lens, 3 a first rectangular prism, 4 a first objective lens, 5 a pentagonal prism, 6 a first reflecting mirror, 7 a second reflecting mirror, 8 a second rectangular prism, 9 a second objective lens, 10 a third rectangular prism, 11 a condensing lens, 12 a photoelectric element, and G a radial grating.

Figure 7:
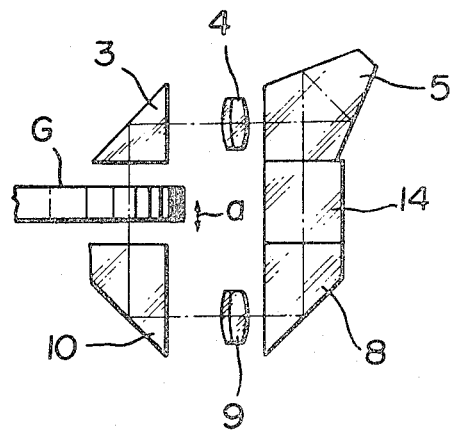
FIG. 7 is a diagrammatic illustration of a modified form of a part of the device shown in FIG. 6.
Figure 8:
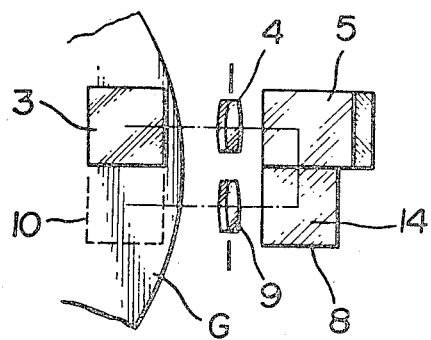
FIG. 8 is a plan view of the device shown in FIG. 7.
Figure 9:
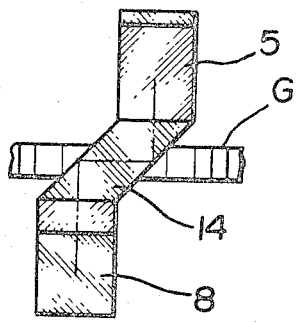
FIG. 9 is a side elevation of the device shown in FIG. 7.

FIGS. 7–9 shown another embodiment of the invention in which the same reference numerals are used as in FIG. 6 but a parallelogram prism 14 is used in place of the first and second reflecting mirrors 6 and 7. The effect of the reflecting plane of this prism 14 is the same as that of the reflecting mirrors 6 and 7 shown in FIG. 6.

Light leaving the light source 1 arrives at the collimator lens 2 where it becomes parallel light which is projected on a portion A of the radial grating G. The light leaving the portion A passes through an optical system including the first rectangular prism 3 and the condensing lens 11 and hence passes again through the plane of the radial grating G. The important feature of the invention is that in this case the light is reflected several times and projected onto the grating G in a direction which is the same as that of the incident light.

The optical path of the above-mentioned optical system will now be described with reference to FIGS. 6–9. The light incident on the grating plane G in a direction perpendicular thereto is reflected at the first rectangular prism 3 to a direction which is at right angles to the incident ray and passes through the center of the first objective lens 4 and is reflected two times at the pentagonal prism 5 to a direction which is at right angles to the light leaving the first objective lens 4. The light leaving the pentagonal prism 5 is reflected at the first and second reflecting mirrors 6 and 7 shown in FIG. 6 or at the parallelogram prism 14 shown in FIGS. 7–9 and projected onto the second rectangular prism 8 where the light is reflected to a direction which is at right angles to the incident light and passes through the center of the second objective lens 9 and reflected at the third rectangular prism 10 to a direction which is at right angles to the light arriving at the prism 10 and perpendicular to the plane of the grating 13, that is, a direction which is the same as that of the incident light.

The first and second objective lenses 4 and 9 are assumed to be equal in focal distances thereof and are assumed to have focal planes which are coincident with the radial grating plane G.

The optical system included in the path from the first rectangular prism 3 to the condensing lens 11 constitutes a real image optical system whose magnification is one and the pentagonal prism 5 acts as an optical system for inverting the position of the image of the grating G from left to right and vice versa.

Thus, an image of a portion A of the grating 13 is placed upon a portion B of the grating 13. The radial grating G has a sector form which is divergent outwards from the center thereof so that it is necessary to invert the position of the image of the grating from left to right and vice versa. If the position of the image of the grating G is inverted from top to bottom in the radial direction the image of the portion A could not be placed upon the portion B of the grating G. Thus, in this embodiment it is impossible to use an inverted real image optical system.

The above-mentioned real image optical system adapted to invert the position of the image of the grating from left to right and vice versa and including the optical elements arranged in the optical path from the first rectangular prism 3 to the third rectangular prism 10 makes it possible to place the image of the portion A of the grating plane upon the portion B thereof to produce the moire fringe. The contrast between the lightest and darkest areas in the moire fringe varies in response to the angular displacement of the grating G. The condensing lens 11 serves to project the image of the portion B where the moire fringe of the grating 13 is produced onto the photoelectric surface of the photoelectric element 12. The photocurrent varies in dependence with the degree of the contrast of the moire fringe. Thus, it is possible to measure a sequence of degrees of the contrast by counting the variations of the photocurrent or by counting the rotating angle of the radial grating plane.

Thus, the device according to the invention comprising a real image system whose magnification is one and adapted to project again an incident light on the grating plane in a direction which is the same as that of the incident light is capable of always placing the image on the portion A of the grating 13 upon the portion B even when the grating plane moves in a direction perpendicular to the plane thereof as shown by arrows a in FIG. 7 and hence of substantially preventing defocusing phenomenon.

Thus, the contrast of the moire fringe does not change even if the grating plane of the radial grating G is moved in a direction perpendicular to the grating plane or is inclined at a certain angle from the original position.

The important feature of the device according to the invention is that the device is easy in assembling and stable in operation.

The invention makes use of a real image system whose magnification is one and adapted to invert the position of the image of the grating from left to right and vice versa. This real image system causes the photoelectric element 12 to produce a number of pulses which are two times larger than the number of gratings corresponding to the amount of the angular displacement of the grating plane G. Thus, the invention has the advantage that the angular displacement of the grating plane G can be measured with an accuracy which is two times higher than that of the well-known device or the total numbers of the gratings on the grating G can be reduced by half.

The inversion of the position of the image of the grating from left to right and vice versa means that the peripheral direction of a small line portion of the radial grating plane is inverted by means of an optical system to produce an inverted image whose peripheral direction is opposite to that of the small line portion.

The above-mentioned real image optical system whose magnification is one and adapted to invert the peripheral direction of the image of the grating from left to right and vice versa is assumed to be an optical system in which an object on the grating plane of the rotatable radial grating and the image of such object are symmetrical with respect to a plane containing a rotating axis of the grating.

As above stated, the device for measuring angular displacement with the aid of a radial grating according to the invention has the advantage that the assembling and adjustment can be effected in an extremely easy manner, that the device as a whole is stable against the movement of the grating plane in a direction perpendicular to the grating plane and the inclination of the grating plane etc. from the original position thereof, that the measurement can be effected with a high accuracy, and that the number of grating lines can be reduced by half.

It will be appreciated that the invention is not restricted to the embodiments described and that many variations are possible to a person skilled in the art without departing from the scope of the invention. For example, a porro's mirror optical system based on the principle of the first kind of porro's prism may be used. In this case, it is necessary to form the inverted real image optical system whose magnification is one by combining the porro's mirror optical system with an erect real image optical system whose magnification is one.

I claim:

1. A device for measuring the magnitude of displacement of diffraction gratings, which comprises a light-transmitting diffraction grating and a real image optical system whose magnification is unity, and including a light source, objectives a reflection optical system and a photocell in an arrangement such that light from the light source is initially projected through the grating in a direction substantially perpendicular thereto, is second directed substantially parallel with the lines of the grating, is third directed in a direction opposite to that of the initially projected light, is fourth directed again in parallel with the grating but in a direction opposite to that of the second direction, and finally again directed through the grating in the same direction as the initially projected light onto said photocell whereby to form a substantially closed and rectangular-shaped light passage, said real image optical system including optical elements all of which, inclusive of said light source and photocell, are arranged in sequence along said light passage, said objectives and reflection optical system producing on said grating an image of the portion of the grating illuminated by said initially projected light such that a moire fringe pattern is produced by the superposing of the image upon the grating, said image being left to right reversed and slightly angularly offset relative to said grating so as to produce said moire fringe pattern, which fringe pattern can be detected by said photocell to measure the amount of displacement of the grating.

2. A device as claimed in claim 1 wherein said objectives and reflection optical system include a first rectangular prism for receiving light from said source, a first objective lens positioned to receive light from said prism, a pentagonal prism in the light path from said lens, a first reflecting mirror for reflecting light received from said pentagonal prism in said second direction, a second reflecting mirror for reflecting light from the first mirror in said third direction, a second rectangular prism for receiving light from the second mirror, a second objective lens for receiving light from the second prism and a condensing lens for transmitting and concentrating light from said second lens to said photocell, said grating being an angularly displaceable radial grating interposed between said first rectangular prism and said third rectangular prism.

3. A device as claimed in claim 1 wherein said objectives and reflection optical system include a first rectangular prism for receiving light from said source, a first objective lens positioned to receive light from said prism, a pentagonal prism in the light path from said lens, a parallelogram prism for refracting light from said pentagonal prism in said second direction, a second rectangular prism for receiving light from the parallelogram prism, a second objective lens for receiving light from the second prism and a condensing lens for transmitting and concentrating light from said second lens to said photocell, said grating being an angularly displaceable radial grating interposed between said first rectangular prism and said third rectangular prism.

4. A device as claimed in claim 1 wherein said objectives and reflection optical system include a first reflecting mirror for reflecting an image of said grating illuminated by said source in said second direction, a second reflecting mirror for reflecting the image from said first mirror in said third direction, a first objective lens in the light passage in said third direction, a fourth reflecting mirror for receiving the image from the first objective lens and reflecting the image in said fourth direction, a second objective lens in the path of the image in said fourth direction, and a fifth reflecting mirror for reflecting the image to said photocell via said grating in the final direction and producing the moire fringe pattern.

5. A device as claimed in claim 4 wherein said grating is an elongated planar grating adapted to measure the linear displacement of the grating.

* * * * *